May 14, 1957  M. A. GILMAN  2,792,157
LIQUID DISPENSING DEVICE
Filed Oct. 7, 1955
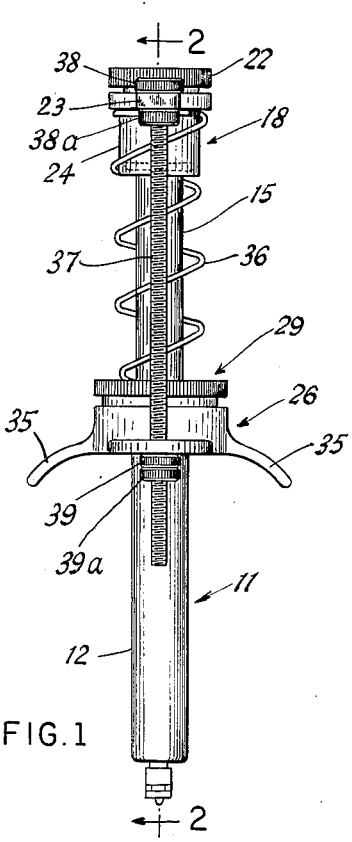
FIG. 1
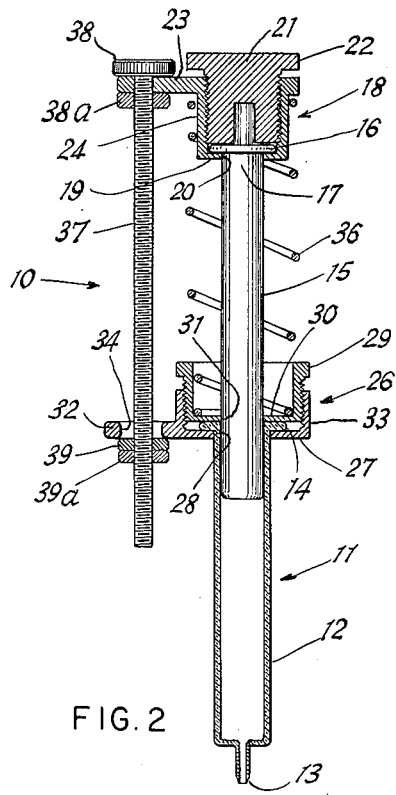
FIG. 2
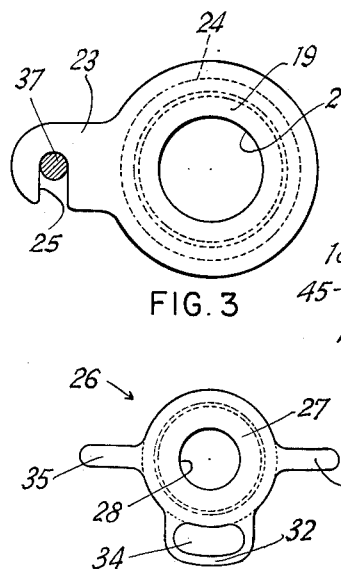
FIG. 3
FIG. 4
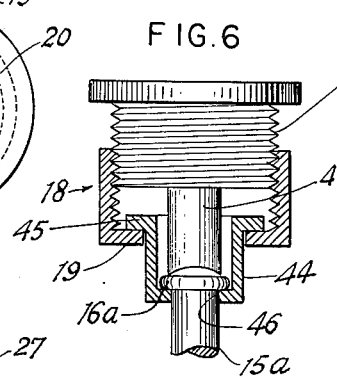
FIG. 6
FIG. 5
INVENTOR.
MARVIN A. GILMAN
BY
*Philip E. Hilbert*
ATTORNEY

United States Patent Office 2,792,157
Patented May 14, 1957

2,792,157

LIQUID DISPENSING DEVICE

Marvin A. Gilman, Croton-on-Hudson, N. Y., assignor to Clay-Adams, Inc., New York, N. Y., a corporation of New York Application October 7, 1955, Serial No. 539,046

5 Claims. (Cl. 222—309)

This invention relates to liquid dispensing and measuring devices. More particularly, the invention concerns pipettes, burettes, syringes and the like, for dispensing accurately measured quantities of liquid. Such devices are used in scientific and medical work where chemical titrations, serological tests and other research activities require means for precisely and rapidly measuring and dispensing quantities of liquid.

Basically, such devices may comprise a barrel and a plunger reciprocable therein, and operable to draw a predetermined quantity of liquid into the barrel upon a determined movement of the plunger outwardly of the barrel, followed by dispensation of the liquid from the barrel upon inward movement of the plunger.

It has been proposed to provide such devices with means for adjustably setting the movement of the plunger relative to the barrel so as to allow rapid dispensing of a large number of equal quantities of liquid. However, such means known in the art have been found to be of complicated construction, difficult to manipulate and adjust, or a source of interference with the reciprocatory movement of the plunger in the barrel.

Accordingly, one object of this invention is to provide a device of the character described, which includes means extending between the barrel and plunger of the device for adjustably limiting the relative movement therebetween, yet being of a construction which does not interfere with the normal reciprocatory movement of the plunger in the barrel.

Another object of this invention is to provide for use with a liquid dispensing device, means for adjustably determining the amount of liquid to be dispensed therefrom, such means comprising a minimum number of components which lend themselves to rapid assembly or disassembly or may be so disposed as to allow the device to be used in a conventional manner free of the adjusting means.

Still another object of this invention is to provide an assembly of components for mounting on the relatively movable parts of a syringe to regulate the relative movement of such parts, together with adapters for accommodating the assembly to syringes of a wide range of sizes.

Other objects of this invention will in part be obvious and in part hereinafter pointed out.

In the drawing, Fig. 1 is a front elevational view of a syringe embodying an assembly embodying the invention;

Fig. 2 is a side elevational view thereof in section;

Fig. 3 is a top plan view of an assembly component attachable to the syringe plunger;

Fig. 4 is a bottom plan view of an assembly component attachable to the syringe barrel;

Fig. 5 is a vertical sectional view thereof showing the use of adapter members; and Fig. 6 is a vertical sectional view of the component shown in Fig. 3, illustrating the use of adapter members therefor.

Referring in detail to the drawing and particularly Figs. 1 and 2, 10 designates an assembly embodying the invention, mounted on a liquid dispensing device such as a syringe 11. The syringe 11 comprises the usual tubular barrel 12 having a dispensing tip 13 at the lower end thereof and a radial flange 14 at the upper end thereof. A plunger 15 is reciprocably mounted in the barrel 12, the plunger 15 having a radial flange 16 at the upper head portion 17 thereof. The barrel 12 and plunger 15 may be formed of glass or other suitable materials in a manner known in the art.

The assembly 10 is operative to adjustably set the relative movement of the plunger 15 and barrel 12 to accurately determine the amount of liquid drawn up into the barrel on the up stroke of the plunger, for dispensing from tip 13 on the down stroke of said plunger.

The assembly 10 comprises an internally threaded cupped member 18 having a bottom wall 19 formed with a central opening 20 for receiving the head portion 17 of plunger 15, the flange 16 thereof resting on the inner surface of wall 19. A screw 21 with a flanged head 22 is screwed into member 18 to hold the same firmly on plunger 15. The member 18 further comprises a lug 23 extending horizontally from the upper end of side wall 24 thereof, the lug being formed with a slot 25 opening on one side thereof, for the purpose later described.

The assembly 10 further includes another internally threaded cupped member 26 having a bottom wall 27 formed with a central opening 28 for receiving the barrel 12, the barrel flange 14 resting on the inner surface of wall 27. An externally threaded cylindrical member 29 having a bottom wall 30 formed with a central opening 31, is screwed into member 26 to hold the same firmly on barrel 12, the opening 31 registering with the open end of the barrel and allowing the plunger 15 to pass therethrough freely.

The cupped member 26 further includes a horizontally extending looped member 32 at the lower end of side wall 33 thereof, said member 32 forming an elongated guide opening 34. Also extending horizontally from the lower end of side wall 33 of member 26 are diametrically aligned, down turned finger grips 35 which are disposed parallel to the longitudinal axis of opening 34.

A coiled spring 36 is disposed concentrically about plunger 15 with its lower end received in member 26, fitting snugly against the inner surface of side wall 33 and bottom wall 30. The upper end of spring 36 closely engages the outer surface of side wall 24 of member 18 and flanged end 24a thereof, thus resiliently biasing the plunger 15 to its outermost position in barrel 12 and restoring the plunger to said position each time the plunger is pressed inwardly into the barrel by a thumb applied to screw head 22 while barrel 12 is supported by fingers applied beneath grips 35.

A threaded rod 37 is located parallel to the longitudinal axis of syringe 11, with the upper end thereof passing through lug slot 25 in member 18; nuts 38, 38a on either side of lug 23 locking the rod in place. The lower end of rod 37 passes freely through guide opening 34 and in spaced relation to member 32 and side wall 33 of member 26. A pair of nuts 39, 39a are screwed onto the lower end of rod 37 below member 32, the nuts spanning guide opening 34.

It will be apparent that nut 39, movable longitudinally on rod 37 and locked in place by nut 39a, forms an adjustable stop engageable with abutment means formed by the underside of member 32, to accurately determine the limits of the movement of plunger 15 outwardly of barrel 12 under the bias of spring 36. In this way, the effective volume of barrel 12 measured by the position of the tip of plunger 15 at its determined outermost position, is precisely set and each time the pluuger is operated to fill the barrel, the identical amount of liquid will be dispensed from barrel tip 13, on which a needle or other liquid transferring means, not shown, may be mounted.

While the upper end of rod 37 is clamped to member 18, the lower end of said rod moves freely relative to member 26 on barrel 12, thus avoiding any binding action between plunger 15 and barrel 12 which might accrue from a rigid interconnection of the parts of assembly 10, which in turn are mounted on said plunger and barrel. Also, plunger 15 may be rotated about its axis within barrel 12, within the limits of the longitudinal extent of guide opening 34.

If desired, rod 37 may be quickly disconnected from member 18 by loosening nuts 38, 38a and sliding the upper end of the rod out of lug slot 25, thus allowing syringe 11 to be used in the conventional manner without the benefit of the stop means. The rod 37 may be altogether removed from the assembly by removing the nuts therefrom at either end thereof and slipping the rod out of guide opening 34.

The openings in cupped members 18, 26 are of a size to accommodate the barrel and plunger of an average size syringe. Feans is provided for adapting the assembly 10 for use with small capacity syringes having small diameter barrels and plungers.

Thus, as shown in Fig. 5, an adapter disc 40 shouldered as at 41, is positioned on wall 27 of member 26, the disc being formed with a small diameter central opening 42 to receive the small sized barrel 12a, the member 29 screwed into member 26 engaging a washer 43 overlying the barrel flange 14a, to hold the member 26 firmly on said barrel 12a.

Also, as shown in Fig. 6, a plunger adapter in the form of a cup shaped member 44 having a radial flange 45 at the upper end thereof, is mounted in member 18 in depending relation thereto, by means of said flange 45. The bottom wall of adapter 44 is formed with a small diameter opening 46 to pass plunger 15a and to seat the flange 16a thereof. The plunger 15a is held firmly in place on member 18 by means of a plug 47 disposed between the plunger flange 16a and the screw 21 on member 18. Such arrangement allows maximum utility of the longitudinal extent of plunger 15a relative to barrel 12a.

It will thus be seen that there has been provided an improved liquid dispensing device in which the several objects of the invention are achieved, and which is well adapted to meet the conditions of practical use.

As various changes might be made in the embodiment of the invention herein described, without departing from the spirit thereof, it is understood that all matter herein shown or described, shall be deemed illustrative and not by way of limitation, except as set forth in the appended claims.

Having thus disclosed my invention, I claim as new and desire to protect by Letters Patent:

1. In combination with a liquid dispensing device comprising a cylindrical barrel and a plunger reciprocably mounted therein, means for regulating the travel of the plunger relative to the barrel comprising a first member mounted on said barrel, a second member mounted on said plunger, an elongated member extending between said first and second members, means for clamping said elongated member to said second member, said first member including an abutment portion adjacent the longitudinal extent of said elongated member and spaced therefrom for freely passing said elongated member therethrough, and stop means adjustably mounted along the longitudinal extent of said elongated member for engagement with the abutment portion of said first member, and spring means between said first and second members for urging said plunger out of said barrel and said stop means into engagement with the abutment portion of said first member.

2. In combination with a liquid dispensing device comprising a barrel and a plunger reciprocably mounted therein, means for regulating the travel of said plunger in said barrel comprising a member mounted on said barrel, a member mounted on said plunger, lug means projecting from one of said members, abutment means projecting from the other of said members, an elongated member extending between said lug means and said abutment means, means for removably securing said elongated member to said lug means, said abutment means being in spaced relation to the longitudinal extent of said elongated member, stop means mounted for movement along the longitudinal extent of said elongated member to adjusted positions thereon for engagement with said abutment means, and spring means between said first and second mentioned members.

3. The combination as in claim 2 wherein said lug means is formed with a slot for removably receiving said elongated member therein, and said abutment means comprises a looped member forming a guide opening passing said elongated member freely therethrough.

4. The combination as in claim 3 wherein said elongated member is threaded, said securing means comprising nuts on said elongated member disposed on either side of said lug means, and said stop means comprises a nut on said elongated member spanning the guide opening in said abutment means.

5. An assembly for use with a syringe including a barrel having a flange at the upper end thereof and a plunger reciprocably mounted therein, said plunger having a flanged head, said assembly comprising a pair of cupped members respectively mounted on the flanged portion of said barrel and the flanged head of said plunger, each of said cupped members including a bottom wall formed with an opening, and adapter means for each cupped member for varying the size of the opening therein, a member fixed to one of said cupped members for conjoint longitudinal movement therewith, abutment means on the other cupped member in spaced relation to the path of travel of said member, and adjustable stop means on said member for engagement with said abutment means.

References Cited in the file of this patent

UNITED STATES PATENTS

| | | |
|---|---|---|
| 2,198,666 | Gruskin | Apr. 30, 1940 |
| 2,521,433 | White | Sept. 5, 1950 |